(12) United States Patent
Greenwood et al.

(10) Patent No.: US 12,017,567 B2
(45) Date of Patent: Jun. 25, 2024

(54) AIR-CONDITIONED VEHICLE SEAT

(71) Applicant: Gentherm GmbH, Odelzhausen (DE)

(72) Inventors: Shane Greenwood, Walled Lake, MI (US); Sai Battula, Windsor (CA)

(73) Assignee: GENTHERM GMBH, Odelzhausen (DE)

( * ) Notice: Subject to any disclaimer, the term of this patent is extended or adjusted under 35 U.S.C. 154(b) by 0 days.

(21) Appl. No.: 18/019,867

(22) PCT Filed: Aug. 2, 2021

(86) PCT No.: PCT/US2021/044120
§ 371 (c)(1),
(2) Date: Feb. 6, 2023

(87) PCT Pub. No.: WO2022/051047
PCT Pub. Date: Mar. 10, 2022

(65) Prior Publication Data
US 2023/0286427 A1    Sep. 14, 2023

Related U.S. Application Data

(60) Provisional application No. 63/074,502, filed on Sep. 4, 2020.

(51) Int. Cl.
*B60N 2/56* (2006.01)
*B60N 2/50* (2006.01)

(52) U.S. Cl.
CPC ......... *B60N 2/5628* (2013.01); *B60N 2/5642* (2013.01)

(58) Field of Classification Search
CPC .. B60N 2/5635; B60N 2/5657; B60N 2/5642; B60N 2/56; B60H 1/00285; B60H 1/00271
See application file for complete search history.

(56) References Cited

U.S. PATENT DOCUMENTS

| | | |
|---|---|---|
| 4,923,248 A | 5/1990 | Feher |
| RE38,128 E | 6/2003 | Gallup et al. |
| 6,629,724 B2 | 10/2003 | Ekern et al. |
| 6,676,207 B2 | 1/2004 | Rauh et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,976,734 B2 | 12/2005 | Stoewe |

(Continued)

FOREIGN PATENT DOCUMENTS

| | | |
|---|---|---|
| DE | 102018208505 A1 | 12/2018 |
| WO | 2019/112823 A1 | 6/2019 |

OTHER PUBLICATIONS

International Search Report and Written Opinion dated Nov. 17, 2021, for International Application PCT/US2021/044120.

*Primary Examiner* — Shin H Kim
(74) *Attorney, Agent, or Firm* — The Dobrusin Law Firm, P.C.

(57) ABSTRACT

A vehicle seat, an air conditioned vehicle seat, and an air conditioning system for a vehicle seat that includes an air mover attached to a first side of a connecting member of the vehicle seat; a gasket attached to a second side of the connecting member; and an air distributor provided adjacent to the gasket on the first side of the connecting member. The air conditioning system is free of adhesive between the air distributor and the gasket.

20 Claims, 4 Drawing Sheets

(56) References Cited

U.S. PATENT DOCUMENTS

| | | | |
|---|---|---|---|
| 7,083,227 B2 | 8/2006 | Brennan et al. | |
| 7,213,876 B2 | 5/2007 | Stoewe | |
| 7,338,117 B2 | 3/2008 | Iqbal et al. | |
| 7,356,912 B2 | 4/2008 | Iqbal et al. | |
| 7,475,938 B2 | 1/2009 | Stoewe et al. | |
| 7,506,938 B2 | 3/2009 | Brennan et al. | |
| 7,587,901 B2 | 9/2009 | Petrovski | |
| 10,252,645 B1* | 4/2019 | Peterson | B60N 2/2872 |
| 10,625,643 B2* | 4/2020 | Iacovone | B60N 2/5875 |
| 10,710,480 B2* | 7/2020 | Iacovone | B60N 2/5635 |
| 11,332,053 B2* | 5/2022 | Longatte | B60N 2/5642 |
| 2007/0176471 A1 | 8/2007 | Knoll | |
| 2009/0218855 A1 | 9/2009 | Wolas | |
| 2018/0361892 A1* | 12/2018 | Iacovone | B60N 2/70 |
| 2018/0361893 A1* | 12/2018 | Iacovone | B60N 2/5657 |
| 2020/0339018 A1* | 10/2020 | Longatte | B60N 2/7094 |
| 2021/0252442 A1* | 8/2021 | Hursit | B01D 29/07 |
| 2021/0362634 A1* | 11/2021 | Stepanov | B60N 2/5642 |
| 2023/0322134 A1* | 10/2023 | Murgod | B60N 2/5642 |
| | | | 454/120 |
| 2023/0406174 A1* | 12/2023 | Blair | B60N 2/5657 |

* cited by examiner

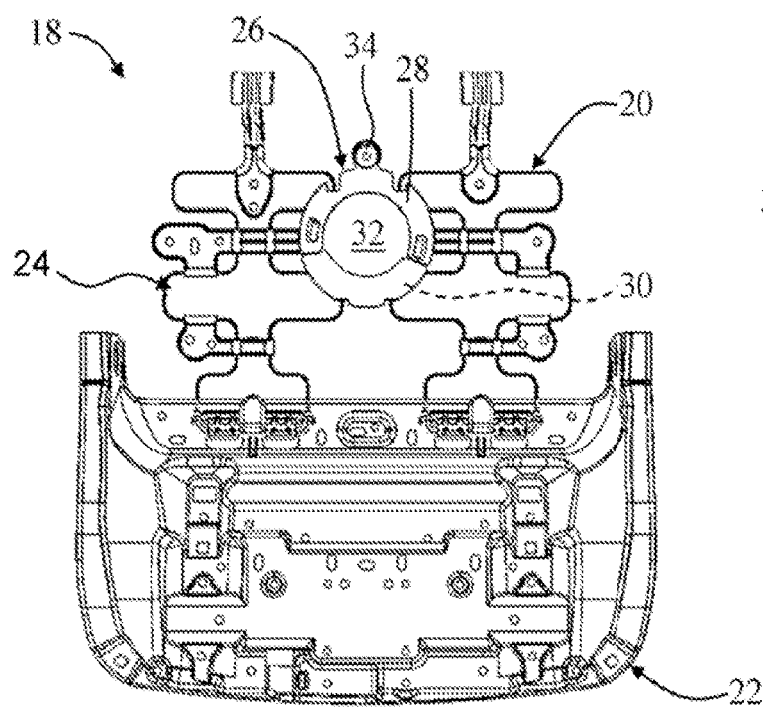
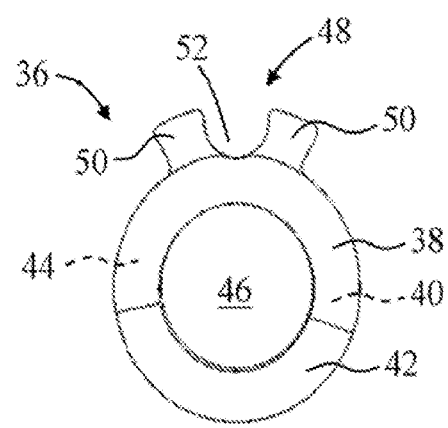
Fig. 3
Fig. 4
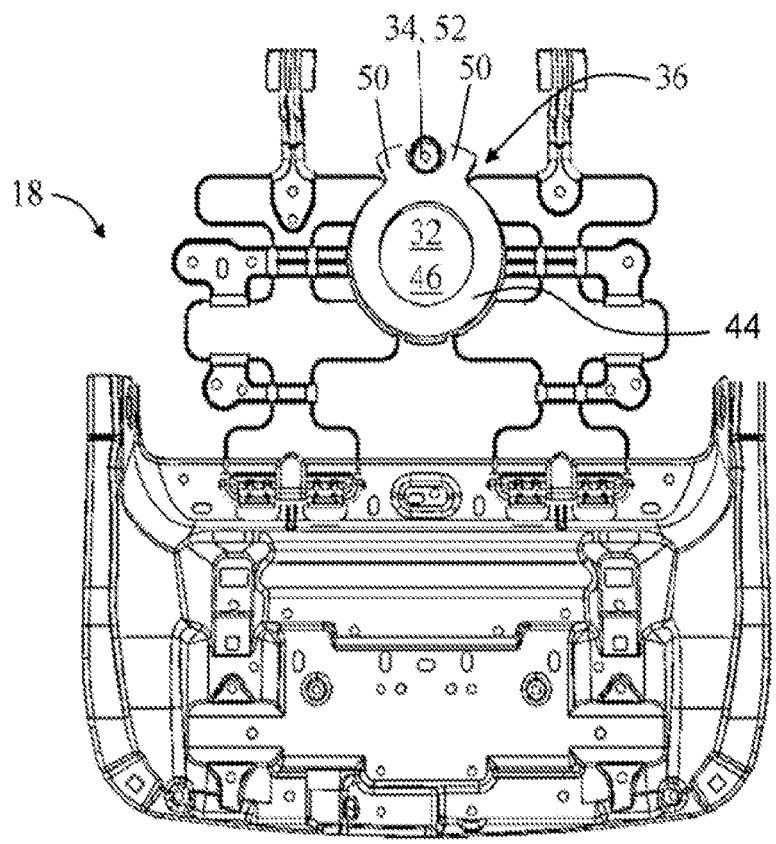
Fig. 5

AIR-CONDITIONED VEHICLE SEAT

PRIORITY

This application is a US National Stage entry of PCT/US2021/044120 filed on Aug. 2, 2021, which claims priority to U.S. 63/074,502 filed on Sep. 4, 2020, the entireties of which are hereby incorporated by reference herein for all purposes.

FIELD

These teachings relate to an air-conditioned vehicle seat, an air conditioning system for a vehicle seat, and to a method of assembly thereof.

BACKGROUND

Some vehicle seats include one or more features for enhancing occupant comfort. For example, some vehicle seats include one or more conditioning systems for directing warm, cool, and/or ambient air towards or away from an occupant.

While certain currently available seats are suitable for their intended purpose, it may be desirable to improve the current state of the art. For example, it may be desirable to reduce the number of components in an air-conditioned seat, which may advantageously reduce cost, weight, and assembly time. For example, it may be desirable to improve techniques for assembling an air conditioning system and/or installing an air conditioning system in a vehicle seat.

SUMMARY

These teachings provide a vehicle seat, an air conditioned vehicle seat, and an air conditioning system for a vehicle seat that includes an air mover attached to a first side of a connecting member of the vehicle seat; a gasket attached to a second side of the connecting member; and an air distributor provided adjacent to the gasket on the first side of the connecting member. The air conditioning system is free of adhesive between the air distributor and the gasket.

These teachings provide a method for assembling a vehicle seat and an air conditioning system for a vehicle seat.

The air conditioning system includes an air mover, an air distributor, and a gasket. The gasket forms a seal between the air mover and the air distributor when a load or occupant is present in the seat. The seat and/or the air conditioning system is free of any adhesive between the gasket and the air distributor. The gasket and the corresponding seat support structure onto which the gasket is applied or installed includes a poka yoke feature to reduce or eliminate assembly variations during attachment of gasket to the frame.

A vehicle seat comprising: a seat support comprising a connecting member having a first side and an opposing second side; a gasket attached to the first side of the connecting member; an air mover attached to the second side of the connecting member; and an air distributor provided adjacent to the gasket on the first side of the connecting member; wherein the vehicle seat is free of adhesive between the air distributor and the gasket. The gasket comprises a sealing surface and pressure from an occupant in the vehicle seat compresses the air distributor against the sealing surface of the gasket to form a seal therebetween. The gasket is attached to the second side of the connecting member with an adhesive. The air mover has a flange that extends through the connecting member and at least partially through the gasket. The gasket comprises one or more gasket poka yoke. The connecting member comprises one or more poka yoke that cooperate with the one or more gasket poka yoke to assist with aligning the gasket on the connecting member. The one or more gasket poka yoke comprises one or more extensions, projections, or fingers. The seat support is a suspension system. The suspension system is connected to a cushion frame assembly. The cushion frame assembly is part of a bottom seating portion of the vehicle seat.

A method of assembling a portion of a vehicle seat, comprising: connecting an air mover to a first side of connecting member on a seat support; attaching a gasket to an opposing second side of the connecting member; and providing an air distributor adjacent to a sealing surface of the gasket; wherein the portion of the vehicle is free of any adhesive between the sealing surface of the gasket and the air distributor. Pressure from a load or occupant acting on the portion of the vehicle seat compresses the air distributor against the sealing surface of the gasket to form a seal therebetween. The air mover comprises a flange and the method comprises extending the flange at least partially through the connecting member and at least partially through the gasket. The attaching step comprises attaching the gasket to the second side of the connecting member with an adhesive. The attaching step comprises removing a liner form the gasket to expose an adhesive on the gasket. The attaching step comprises aligning a gasket poka yoke with a seat support poka yoke. The gasket poka yoke comprises two or more extensions and the seat support poka yoke comprises one or more projections.

BRIEF DESCRIPTION OF THE DRAWINGS

FIG. 3 is a top view of a seat support.
FIG. 4 is a top view of a gasket.
FIG. 5 is a top view of a gasket assembled to a seat support.

DETAILED DESCRIPTION

Figure 1:
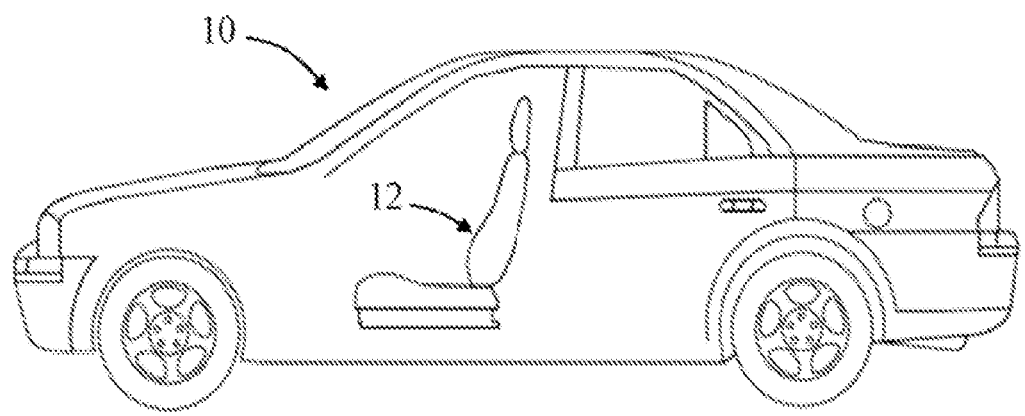
FIG. 1 is a side view of a vehicle comprising a seat.

These teachings provide a seat. The seat may be located in a vehicle. The vehicle may be an automobile, like a passenger car or truck. The vehicle may be an airplane, train, bus, and/or a boat. The seat may also be used in non-vehicular applications, like in a home or office.

The seat may include one or more portions or areas, like a bottom or seating portion, a back or back rest portion, a head rest portion, one or more arm rests, or a combination thereof.

The seat or one or more portions thereof (i.e., the bottom or seating portion, a back or back rest portion, a head rest portion, one or more arm rests, or a combination thereof) may include one or more seat supports. A seat support may provide support for the seat and/or for an occupant and/or load in the seat. The seat support may provide structure onto which one or more components of the seat, like a cushion, air conditioning system, or both can be supported and/or attached. The seat support may be a bottom or seating frame, a back or back rest frame, a seat pan, a suspension system or mat, a cushion, foam, bun, a bolster, a connecting member, or a combination thereof. The one or more seat supports may be covered by one or more covers or layers, like cloth, leather, foam, vinyl, plastic, or a combination thereof.

The seat, seat support, frame, and/or suspension system may include one or more connecting members. A connecting member may be any region of the seat, seat support, bottom frame, back rest frame, suspension system, or a combination thereof onto which one or more components are connected, attached, assembled, and/or supported. The one or more components may be one or more: conditioning systems, air movers, air distributors, gaskets, seals, sensors, occupant sensors, or a combination thereof. The one or more components may be connected, attached, or assembled to the connecting member by way of one or more fasteners, adhesives, or both. For example, the one or more fasteners may be one or more clips, pins, twist locks, screws, rivets, welds, hook-and-loop fasteners, or a combination thereof. For example, the one or more adhesives may be a liquid adhesive, peel and stick tape double sided tape, pressure-sensitive adhesive (PSA) or tape, or a combination thereof.

A connecting member may be or may comprise one or more plates, brackets, flanges, recesses, apertures, wires, rods, fasteners, ribs, or a combination thereof. A connecting member may include one or more openings or apertures so that air can be moved through the connecting member. The connecting member may have a first side and an opposing second side. The two sides may be generally planar to one another or they may be arranged at an angle relative to one another. Relative to an orientation of the vehicle, the two sides of the connection member may be upper and lower sides or surfaces, left and right sides or surfaces, fore and aft sides or surfaces, or a combination thereof.

The connecting member may have one or more poka yoke features. This may help ensure that the one or more components connected, attached, or assembled thereto are arranged in a proper orientation. The one or more components may be one or more: conditioning systems, air movers, air distributors, gaskets, seals, sensors, occupant sensors, or a combination thereof. This may help ensure consistent seat assembly. This may help ensure the components are properly attached or assembled together and/or to the seat to reduce or eliminate potential quality issues. The one or more poka yokes on the connecting member may be one or more flanges, ribs, projections, recesses, apertures, notches, grooves, screws, bores, markings, standoffs, or a combination thereof.

The seat may include one or more air conditioning systems. An air conditioning system may function to move or direct air towards or away from one or more occupants or passengers in or near a seat. The air may be ambient air (i.e., air having a temperature that is generally the same as the surrounding environment). The air may be conditioned air. The conditioned air may be air that is generally warmer than a temperature of the air in the surrounding environment. The conditioned air may be air that is generally cooler than a temperature of the air in the surrounding environment.

The air conditioning system may be provided in or within one or more portions of the seat, like a bottom or seating portion, a back or back rest portion, a head rest portion, one or more arm rests, one or more bolsters, a combination thereof. The air conditioning system may be connected, attached, or assembled to the seat, the bottom or seating portion, a back or back rest portion, a head rest portion, one or more arm rests, a seat support, a frame, a cushion, a connecting member, a suspension system, or a combination thereof.

The seat and/or the air conditioning system may include one or more air distributors. An air distributor may function to distribute or spread air that is supplied by one or more air movers when operating in a push mode (i.e., when air is pushed or blown out towards an occupant in the seat). The pushed air may be distributed or spread to one or more locations of the seat or portions thereof. The air distributor may function to pull, suck, draw, or collect air from one or more locations of the seat or portions thereof by the air mover when the air mover is operating in a pull or suck mode (i.e., when air is being sucked or drawn away from an occupant in the seat).

The air distributor may be comprised of one or more sheets or layers. The air distributor may have an upper sheet or layer that is connected to a lower sheet or layer. The sheets may be connected or sealed at their peripheries to form an open space therein or therebetween. The air distributor may be a bag or have a bag structure.

The upper and lower sheets may be sufficiently air impermeable, except for one or more ventilation apertures defined in the upper and/or lower sheets through which air is directed into and/or expelled out of the air distributor. One or both of the sheets may be sufficiently flexible so that the air distributor can adapt to movement of the seat and/or components thereof when an occupant or load is in the seat. One or both of the sheets may be sufficiently flexible so that the air distributor can adapt to various geometry of the seat and/or seat components to which the air distributor is attached, in contact with, and/or adjacent to. One or both of the sheets may be sufficiently strong to resist puncturing or tearing. One or more both of the sheets may be sufficiently rigid to maintain structure of the air distributor and/or to restrict or prevent bucking or collapse of the air distributor, which may restrict or prevent air from passing therethrough.

One or both of the upper and lower sheets may include one or more air mover apertures. The one or more air mover apertures may be one or more apertures to which an air mover or hose is connected to so that the air can be pushed into the air distributor via the air mover and/or drawn out of the air distributor via the air mover. One or both of the upper and lower sheets may include one or more ventilation holes. The one or more ventilation apertures may be one or more apertures from which air can be pushed out of the air distributor and into the surroundings. The one or more ventilation apertures may be one or more apertures into which air can be drawn or sucked into the air distributor from the surroundings.

The air distributor may include one or more spacer layers or materials within the open space defined between the two sheets or layers. The spacer layer may function to prevent crushing and/or collapse of the open space when an occupant and/or load are in the seat, which may undesirably result in air not being able to be moved through the air distributor.

The air distributor may be of the type disclosed in U.S. Pat. No. 6,869,140B2, the entire disclosure of which is hereby incorporated by reference herein for all purposes.

The air distributor may be connected, attached, or assembled to the seat or one or more portions of the seat like the frame, connecting member, etc. The air distributor may be connected, attached, or assembled via one or more fasteners, adhesives, or both. For example, the one or more fasteners may be one or more clips, pins, twist locks, screws, rivets, welds, hook-and-loop fasteners, or a combination thereof. For example, the one or more adhesives may be a liquid adhesive, peel and stick tape double sided tape, pressure-sensitive adhesive (PSA) or tape, or a combination thereof.

The seat and/or the air conditioning system may include one or more air movers. The one or more air movers may function to move air. The air mover may push, blow, or exhaust air. The air mover may pull, suck, suction, or draw in air. The air may be moved towards or away from the seat, towards or away from an occupant in the vehicle seat, or both. The one or more air movers may move, push, or blow air towards an occupant in the seat. The one or more air movers may move, pull, suck, suction, or draw air away from an occupant in the seat. The air may be ambient air having a generally similar temperature to the air surrounding the seat. The air may be conditioned air. Conditioned air may be air that is generally warmer relative to the surrounding, ambient air. Conditioned air may be air that is generally cooler relative to the surrounding, ambient air. The air mover may be an axial fan, a radial fan, or both.

The one or more air movers may include a thermoelectric device (TED). The TED may heat or warm air as it enters the air mover or as it leaves the air mover. The TED may cool air as the air enters the air mover or as the air leaves the air mover. The TED may be used to heat air and/or cool air that is blown onto the user. The one or more air movers may include a heating device, a cooling device, or both (i.e. a thermoelectric device (TED)). For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes.

The air mover may have a housing. One or more impellers may be contained in the housing. The air mover, the housing, or both may have one or more air inlets through which air is drawn into the housing and one or more air outlets through which air is expelled from the housing. The housing may guide and/or redirect air between one or more inlets and one or more outlets of the air mover.

The housing may have one or more flanges. The flange may project or extend away from the housing. The flange may surround the air inlet, the air outlet, or both. During installation of the air mover to the conditioning system and/or seat, the flange may be guided into and/or through the gasket, the seat support, the connecting member, the air distributor, or a combination thereof.

The air mover or housing may be connected or assembled to the seat support, the suspension system, the frame, the cushion, the connecting member, the air distributor, or a combination thereof. The air mover or housing may be connected or assembled to one or more of the aforementioned components via one or more fasteners. The one or more fasteners may include one or more pins, push pins, twist locks, screws, rivets, hook and loop fasteners, clips, tabs, bands, eyelets, protuberances, welds, or a combination thereof. The air mover or housing may be connected or assembled to one or more of the aforementioned components via a press fit or interference fit. The air mover or housing may be connected or assembled to one or more of the aforementioned components via one or more adhesives. The adhesive may be a liquid adhesive. The adhesive may be a dry adhesive. The adhesive may be a peel and stick layer or tape.

The seat or air conditioning system may include one or more gaskets. The gasket may function to form a seal or connection between one or more components of the seat and/or the air conditioning system. The seal may be a fluid or air seal. The gasket or seal may form an air seal to reduce or eliminate air leaks between two or more adjacent components of the seat and/or the air conditioning system. The gasket may form an air seal between the air mover and the seat, seat portion, seat support, frame, suspension, connecting member, air distributor, or a combination thereof.

The gasket may be attached, connected or assembled to one or more portions of the seat and/or one or more components of the air conditioning system. For example, the gasket may be attached, connected, or assembled to the seat, the bottom or seating portion, a back or back rest portion, a head rest portion, one or more arm rests, a seat support, a frame, a cushion, a connecting member, a suspension system, air mover, air conditioning system, air distributor, or a combination thereof. The gasket may be connected, attached, or assembled to one or more of the aforementioned components via one or more fasteners or adhesives. The gasket may be connected, attached, or assembled to one or more of the aforementioned components via tape, single and/or double sided peel and stick tape, glue, hook and loop fasteners, clips, protuberances and mating apertures, pins, push pins, screws, welds, or a combination thereof.

The gasket may be connected, attached, or assembled to one or more of the aforementioned components by way of pressure or a load acting on the seat. For example, one or both sides of the gasket may be free of traditional connections (i.e., fasteners and/or adhesives) between the gasket and the corresponding adjacent component, such as the air distributor, but may form an air seal with the adjacent component by way of a load or occupant sitting the seat and/or applying pressure on the seat. In this regard, the load or pressure acting on the seat may move, bias, or distort the component (i.e., the air distributor for example) and/or the gasket into contact with one another and/or compress the component and/or the gasket into one another to form the air seal. When the load or occupant is removed from the seat, the air seal may remain intact, or the air seal may break due to the gasket and/or component uncompressing or moving away from one another. The gasket may form an air seal between two or more different interfaces. For example, the gasket may form an air seal between the air mover (or housing thereof), the air distributor, the seat support, the frame, the connecting member, the cushion, or a combination thereof.

The air seal between the gasket and the mating adjacent components may be created by way of the gasket being sandwiched and/or compressed between two components during assembly of the air distribution system and/or the seat. The air seal between the gasket and the mating adjacent components may be created and/or maintained when air is passing through the air distribution system (i.e., when the air distributor is inflated).

The gasket may be made of foam, paper, rubber, silicone, metal, cork, felt, neoprene, nitrile rubber, fiberglass, polytetrafluoroethylene (PTFE or Teflon) or a plastic polymer. The gasket may be a molded or die cut component.

The gasket may have virtually any shape. For example, the gasket may have a circular, oval, square, rectangular, diamond, ring, or triangular shape. The gasket may have one or more openings or passageways through which air can be moved. The opening may have any shape. For example, the opening may have a circular, oval, square, rectangular, diamond, triangular shape.

The gasket may have one or more poka yokes. The poka yoke may help ensure that the gasket is connected, attached, or assembled in a proper orientation and/or position to the seat, seat portion, seat support, frame, suspension system, connecting member, air mover, air distribution system, or a combination thereof. This may help ensure consistent seat assembly. This may help ensure the components are properly attached or assembled together and/or to the seat to reduce or eliminate potential quality issues, such as, for example, air flow being blocked or deflected. The one or more poka yokes may be one or more flanges, ribs, projections, recesses, apertures, notches, grooves, markings, standoffs, or a combination thereof.

The gasket may have two opposing sides (i.e., a first side and a second side). One or both of the sides may have an adhesive. The adhesive may be exposed. The adhesive may be covered with a liner or covering that must be removed to expose the adhesive. The adhesive may be applied onto one or both of the sides of the gasket before applying or installing the gasket to the seat, seat portion, seat support, frame, suspension system, connecting member, air mover, air distribution system, or a combination thereof. One or both sides of the gasket may be free of any adhesives and may form a connection with one or more of the seat components (i.e., the seat, seat portion, seat support, frame, suspension system, connecting member, air mover, air distribution system, or a combination thereof) by way of pressure applied onto the seat via a load or occupant and/or being sandwiched between two or more components.

The seat and/or the air conditioning system may include one or more occupant sensors. An occupant senor may be any type of senor or combination of sensors that senses or detects presence of a load or one or more passengers in or near a seat. The occupant senor may be a membrane sensor, a capacitive sensor, a force sensor, a mass sensor, or a combination thereof. A computer or processor may monitor the occupant senor. For example, the computer or processor may be in electrical communication with the occupant senor and when the occupant senor determines or detects that the seat is free of an occupant the air conditioning system may remain OFF. In contact, when the occupant senor determines or detects that an occupant is in the seat, the air conditioning system may turn ON or remain ON.

The seat, the air conditioning system, or both may be assembled and/or connected together via a method. The method may include one or more steps described herein. The one or more steps may be performed in virtually any other. One or more steps may be combined with one or more other steps into a single step. Two or more steps may be combined into a single step. One or more steps may be eliminated. One or more steps may be duplicated. One or more of the method steps described herein may be reversed to disassemble the seat, the air distributing system, or both.

The method may include a step of providing a seat, one or more seat portions, seat supports, frames, suspension systems, connecting members, cushions, air movers, air distributors, air conditioning systems, gaskets, or a combination thereof.

The method may include a step of assembling the seat. This may include assembling or connecting one or more of the seat portions, seat supports, frames, suspension systems, connecting members, cushions, or a combination thereof. The method may include a step of attaching the suspension system to the seat frame.

The method may include a step of exposing an adhesive on the gasket. The method may include a step of removing a linear from the gasket to expose the gasket. The method may include a step of applying an adhesive on the gasket. The adhesive may be applied onto one or more sides or surfaces of the gasket. The method may include a step of applying or exposing an adhesive onto the connecting member, the frame, seat support, or a combination thereof. The method may include a step of applying an adhesive onto the frame, connecting member, seat support, or a combination thereof.

The method may include a step of installing the gasket onto the connecting member, frame, suspension, or a combination thereof. The method may include a step of aligning a poka yoke feature on the connecting member and a poka yoke feature on the gasket to ensure proper location/orientation of the gasket on the frame. For example, the method may include a step of aligning one or more recesses of the gasket poka yoke with one or more projections on the connecting member poka yoke.

The method may include a step of installing or attaching the air mover. The air mover may be installed or attached to the seat, frame, or connecting member before or after the gasket is installed. The air mover or a portion of the air mover, such as a flange of the air mover, may be slid or passed through an opening defined in the gasket and/or the connecting member. The gasket may be installed on one side of the frame or connecting member and the air mover is installed on an opposing second side of the frame or connecting member. The air mover may be connected to the frame or connecting member with one or more fasteners or adhesives. The air mover may be rotated, moved, or slid into a locking position during installation thereof. After the air mover is installed, the gasket should be free from covering the air mover opening through which air is drawn into the housing and/or expelled from the housing. After the air mover is installed, the gasket may be in contact with the air mover housing and/or the flange. After the air mover is installed, a gap may be defined between the air mover housing and/or the flange and the gasket. The method may include a step of connecting a seat harness to the air mover. The seat harness may function to provide power and/or control the air conditioning system and/or the mover.

The method may include a step of attaching or installing the air distributor. The air distributor may be installed on the frame, seat, cushion, connecting member, gasket, or a combination thereof. The air distributor may be installed before or after the air mover is installed. The air distributor may be installed on the frame, connecting member, and/or seat before or after the gasket is installed. The air distributor is installed by laying the air distributor against the gasket. An opening of the air distributor should be aligned with an opening defined in the gasket. A portion of the air mover, such as the flange surrounding the air mover opening, may be received into the opening of the air distributor. The air distributor may lay flat against the sealing surface of the gasket (i.e., in contact therewith) or there may be a gap defined between the air distributor and the gasket. Preferably there is no adhesive or fasteners provided between the air distributor and the gasket. In this regard, the air distributor may lay flat against the gasket. There may be one or more poka yoke features to ensure proper alignment of the air distributor opening with the gasket opening. The air distributor may be connected to the frame, connecting member, or both via one or more fasteners and/or adhesives.

The method may include a step of installing or attaching one or more occupant sensors. The occupant sensor may be attached to either side of the frame or connecting member, the air distributor, or a combination thereof. The occupant sensor may be attached via one or more fasteners or adhesives.

The method may include a step of installing the seat cushion and/or foam onto the frame, connecting member, seat portion, or a combination thereof. The method may include a step of aligning one or more ventilation holes in the air distributor with one or more ventilation holes in the cushion or foam. The air mover and/or the gasket may be installed on to the frame and/or the connecting member before or after the seat foam and/or cushion are installed.

The method may include a step of creating a seal between the air distributor and the gasket. This may be accomplished by providing a load, weight, or presence of an occupant in the seat, which may function to compress or move one or both of the air distributor and the gasket into contact with one another and form the seal. The seal may be a fluid seal that restricts or prevents air from escaping or seeping therebetween. After the load, weight, or passenger is removed from the seat, the fluid seal may remain, or the fluid seal may be broken due to the air distributor and/or gasket uncompressing and moving away from one another.

FIG. 1 illustrates a vehicle 10. The vehicle 10 includes a vehicle seat 12.

Figure 2:
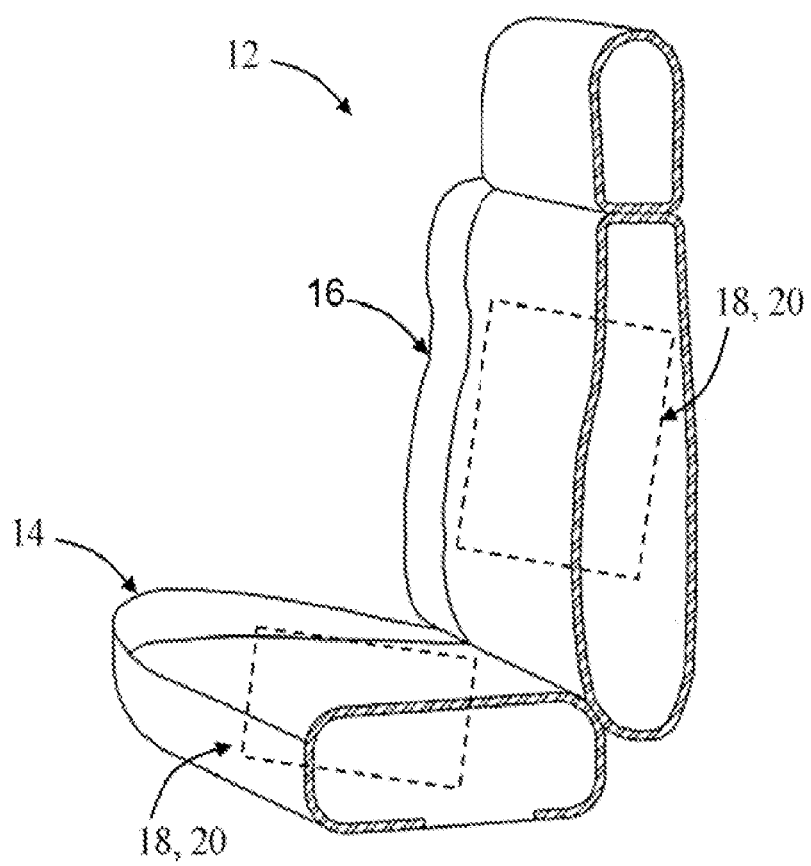
FIG. 2 is a perspective view of a seat.

FIG. 2 illustrates a vehicle seat 12. The vehicle seat 12 has a seat portion 14 and a back portion 16. The seat portion 14 and the back portion 16 may each have a seat support 18. The seat 12 may include an air conditioning system 20. The air conditioning system 20 may include one or more components disclosed herein, including: one or more gaskets 36, one or more air movers 54, and/or one or more air distributors 68.

FIG. 3 illustrates a seat support 18. The seat support 18 may be provided within the seat portion 14 (FIG. 2). However, in some configurations, the seat support 18 may also, or instead, be provided within the back portion 16 (FIG. 2).

The seat support 18 comprises a frame 22 and a suspension system 24. The suspension system 24 has a connecting member 26. The connecting member 26 has a first side 28 (facing up, out of the page), an opposing second side 30 (facing down, into the page), and a through hole 32 extending between the two sides 28, 30. The connecting member 26 has one or more poka yokes 34. In this instance, the poka yoke 34 is a projection, button, knob, rib, tab, stand off, boss, or other feature projecting up and away from the connecting member 26.

FIG. 4 illustrates a gasket 36. The gasket 36 comprises a first side 38 having an adhesive 40 that may be covered by or with a liner 42, a second side 44 that opposes the first side 38, and a through hole 46 extending through or between the two sides 38, 44. The opposing second side 44 may be free of any adhesive. The second side 44 of the gasket 36 may also be referred to as a sealing surface. The gasket 36 has one or more gasket poka yokes 48. In this instance, the gasket poka yoke 48 may include one or more extensions or fingers 50 extending from a perimeter of the gasket and a curved or semi-circular recess 52 between two adjacent extensions or fingers 50.

With additional reference to FIG. 5, the gasket 36 is illustrated attached or connected to the connecting member 26. To attach the gasket 36 to the connecting member 26, the liner 42 is separated or removed from gasket 36 thereby exposing the adhesive 40. The exposed adhesive 40 is then brought into contact with the first side 28 of the connecting member 26. The adhesive 40 thus adheres or secures the gasket 36 to the connecting member 26.

The gasket 36 is attached or connected to the connecting member 26 and/or to the seat support 18 such that the through holes 32, 46 are generally aligned. This ensures there will be no obstruction of air passing through the through holes 32, 46 during operation of the air conditioning system. To ensure the through holes 32, 46 are generally aligned, the gasket poke yoke 48 cooperates with the poka yoke 34 of the connecting member 26. More specifically, the poka yoke 34 of the air mover connecting member 36 is arranged in the recess 52 defined between the two extensions 50 of the gasket 36.

Figure 6:
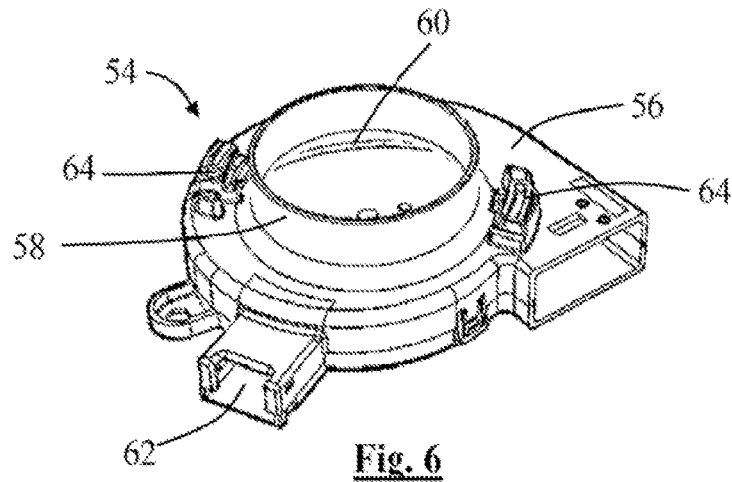
FIG. 6 is a perspective view of an air mover.

FIG. 6 illustrates an air mover 54. The air mover 54 has a housing 56, a flange 58 extending from the housing 56, and an opening 60 defined in the flange 58. The air mover 64 has an electrical connector 62 and one or more air mover connectors 64. The connector 62 may be used to connect a seat harness to the air mover 54. The seat harness may function to provide power and/or control the air conditioning system and/or the air mover 54.

Figure 7:
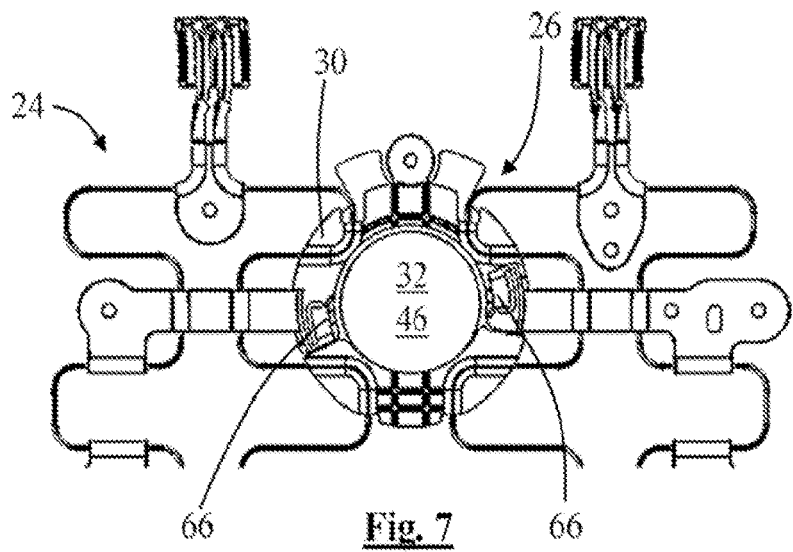
FIG. 7 is a bottom view of a portion of a seat support.

FIG. 7 illustrates the second side 30 or bottom of the connecting member 26 of the suspension system 24. The connecting member 26 includes one or more connectors 66.

Figure 8:
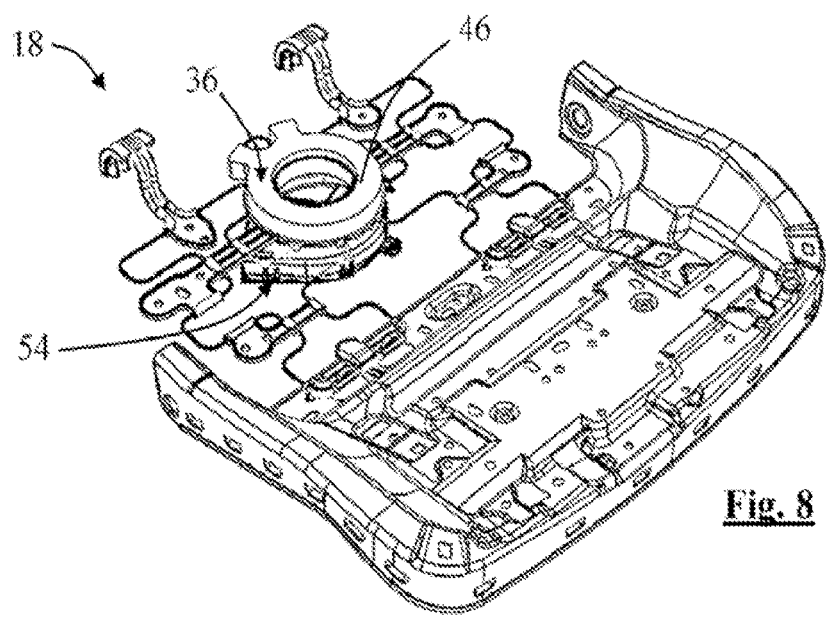
FIG. 8 is a perspective view of a seat support with a gasket and air mover assembled thereto.

With additional reference to FIG. 8, the gasket 36 and the air mover 54 are shown connected to the suspension system 24. The air mover 54 can be connected to the suspension system 24 by aligning the flange 58 with the through holes 32, 46 defined in the connecting member 26 and the gasket 36 and inserting the flange 58 at least partially therethrough and then engaging the connectors 64, 66 to engage or lock the air mover 54 to the suspension system 24. There may or may not be additional fasteners between the air mover 54 and the gasket 36.

In this assembled configuration illustrated in FIG. 8, the gasket 36 is adhered to the first side of the seat support 18 and the air mover 54 is attached to the opposing second side of the seat support 18.

Figure 9:
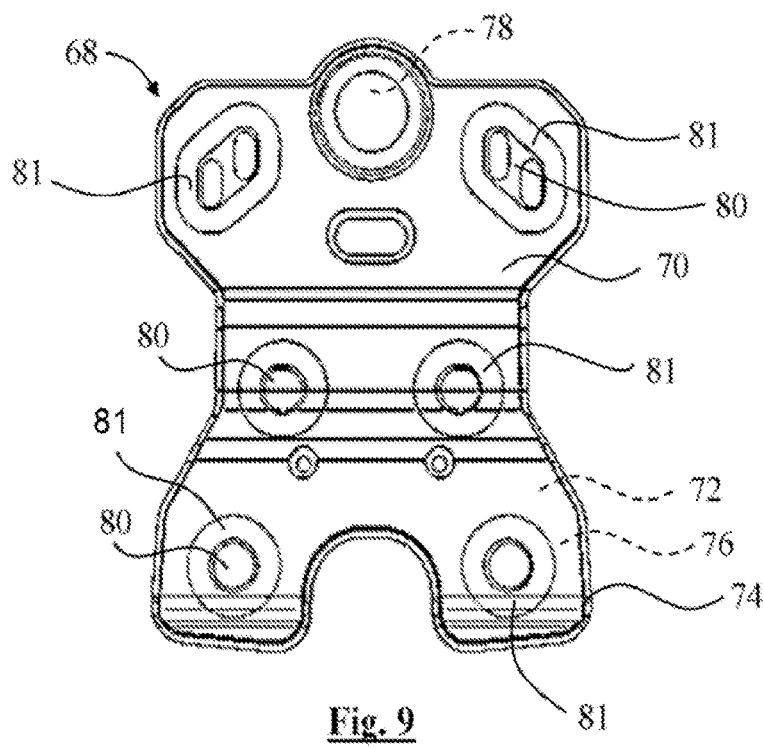
FIG. 9 is a top view of an air distributor.

FIG. 9 illustrates an air distributor 68. The air distributor 68 may comprise a first sheet or side 70 and an opposing second sheet or side 72. The sheets 70, 72 may be sealed or joined at their peripheries 74 to form a bag or bag structure. The bag structure may have an open region or space 76 defined between the two sheets 70, 72. The air distributor has an air mover aperture 78 that provides a passageway for air to enter and/or exit the bag structure by being pulled or pushed via the air mover 54. The air distributor 68 may have one or more ventilation apertures 80 for air to enter and/or exit the bag structure. The apertures 80 may be fluidly connected to one or more corresponding aperture, openings, or passageways defined in the seat cushion or foam to be directed towards or away from the user.

One or more gaskets 81 may at least partially surround one or more of the apertures 80. The gasket 81 may be made of the same material as the gasket 36 disclosed above. Any statements made relating to gasket 36 may apply to gasket 81 and vice versa.

The gasket 81 may function to provide a fluid-tight seal between the air distributor 68 and the seat cushion or foam. Occupant weight or downward pressure acting on the seat cushion or foam may function to compress the seat cushion or foam, gasket 81 and the air distributor 68 to create a fluid tight seal that restricts or prevents air from escaping between the air distributor 68 and cushion or foam. The one or more gaskets 81 may have an adhesive on one or both sides thereof for attaching to the air distributor 68 and/or seat cushion or foam. However, in certain configurations, the gasket 81 may be free of an adhesive between the seat cushion or foam and gasket surface that contacts the seat cushion or foam. In some configurations, when the occupant weight or pressure is removed from the seat, a slight air gap may be defined between the seat cushion or foam and the adjacent surface of the air distributor 68. Alternatively, the air distributor 68 and seat cushion or foam may remain in contact such that no air gaps are defined therebetween when little or no occupant load is in the seat.

However, in some configurations, the air distributor 68 may be free of any gaskets 81 surrounding the apertures 81. In these configurations, the sheet or side 70 of the air distributor 68 may be adjacent to or in contact with the seat cushion or foam. Occupant weight or pressure acting on the seat cushion or foam may compress the seat cushion or foam against the sheet 70 of the air distributor 68 to create a fluid tight seal that restricts or prevents air from escaping between the air distributor 68 and cushion or foam. In some configurations, when the occupant weight or pressure is removed from the seat, a slight air gap may be defined between the seat cushion or foam and the adjacent surface of the air distributor 68. Alternatively, the air distributor 68 and seat cushion or foam may remain in contact such that no air gaps are defined therebetween when little or no occupant load is in the seat.

Figures 10, 11:
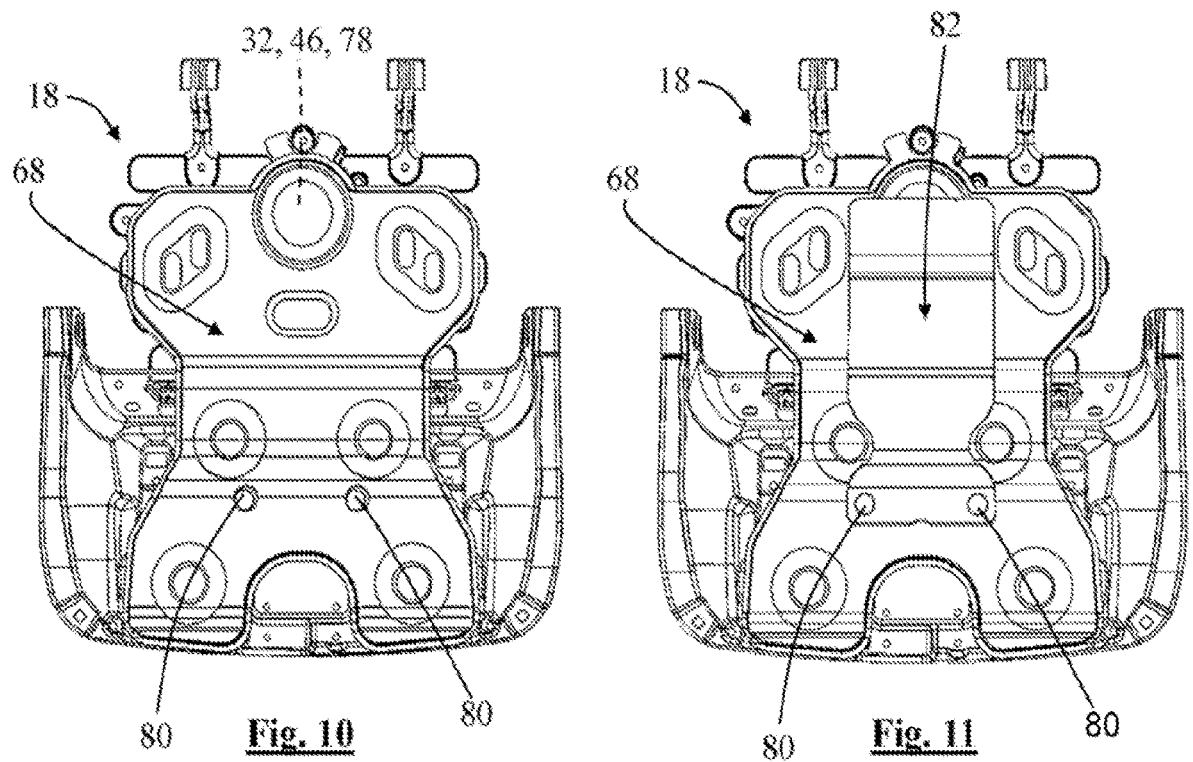
FIG. 10 is a top view of an air distributor assembled to a seat support.
FIG. 11 is a top view of an occupant sensor and an air distributor assembled to a seat support.

FIG. 10 illustrates an air distributor 68 attached to the seat support 18. The air distributor 68 is attached to the seat support 18 by aligning the air mover aperture 78 defined in the air distributor 68 with the through hole 32 defined in the connection member 26 and the through hole 46 defined in the gasket 36. The air distributor 68 placed or provided against or adjacent to the second side 44 of the gasket 36 (See FIG. 8). The second side 44 may be referred to as the sealing surface of the gasket 36. There is no adhesive provided between the air distributor 68 and the second side 44 of the gasket 36. One or more fasteners 80 may secure or attach the air distributor to the seat support 18.

FIG. 11 illustrates an air distributor 68 and an occupant sensor 82 attached to the seat support 18. The occupant sensor 82 is provided onto of the air distributor 68 and both of the occupant sensor 82 and air distributor 68 are attached to the seat support 18 with one or more fasteners 80. In other configurations, the occupant sensor 82 may be installed or attached first and then the air distributor 68 can be installed or attached onto the occupant sensor 82.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. An air conditioning system for a vehicle seat comprising:
 an air mover attached to a first side of a connecting member of the vehicle seat;
 a gasket attached to a second side of the connecting member; and
 an air distributor provided adjacent to the gasket;
 wherein the air conditioning system is free of adhesive between the air distributor and the gasket; and
 wherein the air mover comprises a flange that extends at least partially through the connecting member and at least partially through the gasket.

2. The air conditioning system according to claim 1, wherein the gasket comprises a sealing surface and pressure from an occupant in the vehicle seat compresses the air distributor against the sealing surface of the gasket to form a seal therebetween.

3. The air conditioning system according to claim 1, wherein the gasket is attached to the second side of the connecting member with an adhesive.

4. The air conditioning system according to claim 3, wherein the gasket is free from extending through the connecting member to the first side of the connecting member.

5. The air conditioning system according to claim 4, wherein the gasket comprises a liner that is configured to be removed to expose the adhesive prior to attaching the gasket to the second side of the seat frame.

6. The air conditioning system according to claim 1, wherein the gasket is made of foam.

7. The air conditioning system according to claim 1, wherein the gasket comprises an adhesive that is covered by a liner.

8. The air conditioning system according to claim 1, wherein the gasket has a circular shape and has a pair of extensions extending from a perimeter of the gasket.

9. The air conditioning system according to claim 8, wherein the gasket comprises a curved recess between the pair of extensions.

10. The air conditioning system according to claim 9, wherein the flange engages connectors to engage or lock the air mover to the connecting member.

11. The air conditioning system according to claim 1, wherein the connecting member is part of a suspension system of the vehicle seat.

12. The air conditioning system according to claim 1, wherein the gasket comprises one or more gasket poka yoke, and the connecting member comprises one or more poka yoke that cooperate with the one or more gasket poka yoke to assist with aligning the gasket on the connecting member.

13. The air conditioning system according to claim 1, wherein the air distributor comprises one or more ventilation apertures.

14. The air conditioning system according to claim 13, wherein the air conditioning system comprises a gasket at least partially surrounding the one or more ventilation apertures.

15. The air conditioning system according to da claim 1, wherein the connecting member is part of a suspension system of the vehicle seat that is sandwiched between the air mover and the gasket.

16. An air conditioning system for a vehicle seat comprising:
    an air mover attached to a first side of a seat frame of the vehicle seat;
    a gasket made of foam, that is attached to a second side of the seat frame with an adhesive, the gasket is free from extending through the seat frame to the first side of the seat frame; and
    an air distributor configured to be situated adjacent to the gasket on the first side of the seat frame;
    wherein the air conditioning system is free of adhesive between the air distributor and the gasket,
    wherein the air mover comprises a flange that extends at least partially through the connecting member and at least partially through the gasket.

17. The air conditioning system according to claim 16, wherein the seat frame comprises a through hole and the gasket has a circular shape with a through hole.

18. The air conditioning system according to claim 16, wherein the gasket comprises a liner that is removed to expose the adhesive prior to attaching the gasket to the second side of the connecting member.

19. The air conditioning system according to claim 18, wherein the gasket has a circular shape and has a pair of extensions extending from a perimeter of the circular shape.

20. The air conditioning system according to claim 19, wherein the gasket comprises a curved or semi-circular recess between the pair of extensions, and the seat frame comprises a projection that is arranged in the recess.

\* \* \* \* \*

UNITED STATES PATENT AND TRADEMARK OFFICE
CERTIFICATE OF CORRECTION

| | |
|---|---|
| PATENT NO. | : 12,017,567 B2 |
| APPLICATION NO. | : 18/019867 |
| DATED | : June 25, 2024 |
| INVENTOR(S) | : Shane Greenwood et al. |

It is certified that error appears in the above-identified patent and that said Letters Patent is hereby corrected as shown below:

In the Claims

Column 13, Line 28, delete "according to da claim 1" and insert --according to claim 1--

Column 14, Line 5, delete "that is attached to" and insert --that is attached onto--

Signed and Sealed this
Thirteenth Day of August, 2024

Katherine Kelly Vidal
*Director of the United States Patent and Trademark Office*